Patented Sept. 22, 1942

2,296,600

UNITED STATES PATENT OFFICE 2,296,600

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 21, 1941,
Serial No. 384,598

10 Claims. (Cl. 252—341)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described which is used as the demulsifier in our improved process for resolving petroleum emulsions, is exemplified by the acid, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be indicated as being of the dibasic type, by the formula

HOOC.D.COOH, then the fractional ester obtained by reaction between equimolar quantities may be indicated by the following formula:

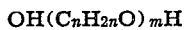

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

OH(C₂H₄O)ₘH

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

OH(CₙH₂ₙO)ₘH

in which $m$ has its previous significance and $n$ represents a numeral varying from 2 to 4.

Thus, the bulk of the demulsifying materials herein described may be indicated within certain variations, as hereinafter stated, by the neutral ester derived by esterification of one mole of a glycol of the kind above described, with two moles of a fractional ester of the kind previously indicated. The formation of the compound may be indicated by the following reaction, although obviously, it is immaterial what particular procedure is employed to produce the particular chemical compound or product:

T.OOC.D.COOH+OH(C₂H₄O)ₘH+
HOOC.D.COO.T→
T.OOC.D.COO(C₂H₄O)ₘ₋₁C₂H₂.OOC.D.COO.T

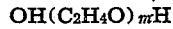

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–17 oxyalkylene groups, particularly 8–12 oxyethylene groups. The preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic products employed as reactants in the manufacture of the present compounds are substituted amides characterized by the presence of a hydroxy hydrocarbon radical containing at least one alcoholic hydroxyl radical as a substituent for an amino hydrogen atom. Such hydroxylated amides are of the kind in which the acyl radical is derived from a detergent-forming acid.

Detergent-forming acids are monocarboxy acids having more than 8 and not over 32 carbon atoms, and characterized by the fact that they combine with alkalies such as caustic soda, caustic potash, ammonia, triethanolamine, and the like to produce soap or soap-like materials. The best examples are, of course, the higher fatty acids, such as oleic acid, stearic acid, palmitic acid, etc. In addition to the higher fatty acids, other well known members of this class include resinic acids, abietic acids, naphthenic acids, and acids obtained by the oxidation of petroleum hydrocarbons and commonly referred to as oxidized wax acids.

Generally speaking, the higher fatty acids are apt to contain from 12–14 carbon atoms as a lower limit, to 18–22 carobn atoms as an upper limit. Oxidized wax acids may contain as many as 32 carbon atoms.

It is well known, of course, that amides may be obtained by reaction between long chain carboxy acids and monoalkylolamines, such as monoethanolamine, monopropanolamine, monobutanolamine, etc. The manufacture of such chemical compounds, particularly where derived from higher fatty acids, is described in British Patent No. 450,672, dated July 17, 1936, to Orelup. Another procedure which has been employed for the same purpose is to react the monoalkylolamine with the acyl chloride derived from a suitable carboxy acid. Still another method employs the use of an alkylene oxide, such as ethylene oxide, propylene oxide, butylene oxide, and the like, in connection with an amide. Reference is made to U. S. Patent No. 2,002,613, dated May 28, 1925, to Orthner and Keppler. This latter method for producing oxy-amides is not limited to the use of alkylolamines, such as monoalkylolamines, dialkylolamines, or the like, as the raw material, but may employ alkylamines, arylamines, aralkylamines, alicyclic amines, etc., so as to obtain hydroxylated derivatives. Naturally, the methods employing monoalkylamines, and particularly the process in which acyl chlorides are employed, may also use such materials as diethanolamine, dipropanolamine, dibutanolamine, and the like. Amides so obtained may have as many as six hydroxyl radicals in the amino-hydrogen position.

It is known, of course, that when primary and secondary amines are reacted with various alkylene oxides, one may obtain hydroxyethyl alkylamines, hydroxypropyl alkylamines, etc. The reaction, for example, between a primary amine and ethylene oxide, yields a material of the formula type $HO.CH_2.CH_2.NHR$. Such amines may be reacted with detergent-forming carboxy acids to give suitable amides.

Briefly, then, in a practical way amides can be derived from detergent-forming acids or some derivative, usually an ester. Indeed, esters are often more suitable reactants for amidification than the acids themselves. As to the manufacture of esters, see the following United States patents, to wit: Nos. 1,160,595, dated Nov. 16, 1915, to Gruter et al.; 2,221,674, Nov 12, 1940, to Ellis; and 2,177,407, Oct. 24, 1939, to Hansley. See also Organic Syntheses, volume V, page 88, 1930.

As to the procedure for the manufacture of amides or substituted amides, see the following United States patents: Nos. 2,058,013, dated Oct. 20, 1936, to Henke et al.; 2,013,108, Sept. 3, 1935, to Reppe et al.; 1,475,477, Nov. 27, 1923, to Ellis; and 1,954,433, Apr. 10, 1934, to Thomas et al.

In any event, suitable amides having been obtained, either from the acids, esters, or any other derivative, they may then be treated with ethylene oxide, propylene oxide, butylene oxide, glycid, or the like. Similarly, instead of obtaining the amides, one may obtain the substituted amides, i. e., the derivatives of amylamine, cyclohexylamine, aniline, benzylamine, or the like, particularly the substituted amides, in which the hydrocarbon radical replacing an amino hydrogen atom contains not over 7 carbon atoms. Such substituted amides then can be treated with oxyalkylating agents in the same manner previously described in connection with the amides.

Another suitable procedure is simply to react the selected ester or acid or other suitable derivative, with a hydyroxylated primary amine, such as monoethanolamine, monopropanolamine, monobutanolamine, monoglycerylamine, tris(hydroxymethyl)aminomethane, and the like. Such reactants readily yield the hydroxylated amide of the kind contemplated.

Reactions can also be conducted with secondary hydroxylated amines of the kind exemplified by diethanolamine, dipropanolamine, diglycerylamine, etc. When this latter type of reactants is employed, one is more apt to obtain a significant amount of esterified compound along with the amide derivative. The same also applies when material of the type exemplified by ethyl ethanolamine, phenyl ethanolamine, cyclohexyl ethanolamine, etc., are employed for amidification. In any event, one can readily obtain amides of the kind indicated by the following formulae in which RCO is the acyl radical of a detergent-forming acid:

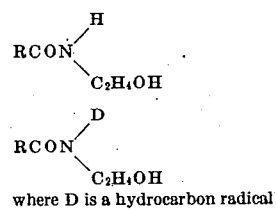
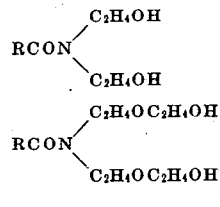
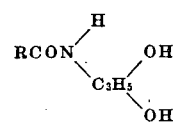
where D is a hydrocarbon radical
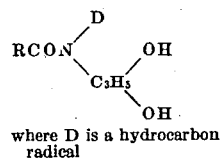
where D is a hydrocarbon radical
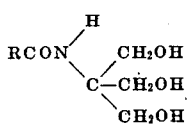

Our preferred amides are derivatives of fatty acids, and especially unsaturated fatty acids, such as oleic acid, ricinoleic acid, etc.

*Intermediate product, Example 1*

One pound mole of nonaethylene glycol is reacted with two pound moles of maleic anhydride so as to form nonaethylene glycol dihydrogen dimaleate.

*Intermediate product, Example 2*

A mixture of lower non-distillable polyethylene glycols, representing approximately deca- to tetradecaethylene glycol, is substituted for nonaethylene glycol in the preceding example.

*Intermediate product, Example 3*

A 50–50 mixture of nonaethylene glycol and lower nondistillable polyethylene glycols of the kind described in the previous example is substituted for nonaethylene glycol in Example 1.

*Intermediate product, Example 4*

Adipic acid is substituted for maleic anhydride in Examples 1–3 preceding.

*Intermediate product, Example 5*

Oxalic acid is substituted for maleic anhydride in Examples 1–3 preceding.

*Intermediate product, Example 6*

Citric acid is substituted for maleic anhydride in Examples 1–3 preceding.

*Intermediate product, Example 7*

Succinic anhydride is substituted for maleic anhydride in Examples 1–3 preceding.

*Composition of matter, Example 1*

One pound mole of the intermediate product of the kind described in Intermediate product, Examples 1, 2 and 3, above, is reacted with two pound moles of the oleic acid amide of monoethanolamine, until substantially all dibasic carboxyl acidity has disappeared. Time of reaction may vary from a few hours to as much as 20 hours.

*Composition of matter, Example 2*

Ricinoleic acid amide of monoethanolamine is substituted for the oleic acid amide of monoethanolamine in the preceding example.

*Composition of matter, Example 3*

The amide derived from monoethanolamine and cocoanut oil fatty acids is substituted for the oleic acid amide of monoethanolamine in Composition of matter, Example 1.

*Composition of matter, Example 4*

The amide derived from monoethanolamine and teaseed oil fatty acids is substituted for the oleic acid amide of monoethanolamine in Composition of matter, Example 1.

*Composition of matter, Example 5*

The substituted amide derived from diethanolamine, which may be obtained by means of ethylene oxide and the unsubstituted amide, is substituted for the corresponding monoethanolamine derivative in the preceding four examples.

*Composition of matter, Example 6*

The amide derived from tris(hydroxymethyl)-aminomethane is substituted for the amide derived from monoethanolamine in Composition of matter, Examples 1–4, inclusive.

*Composition of matter, Example 7*

The corresponding amide derived from monoglycerylamine is substituted for the amide derived from monoethanolamine in Composition of matter, Examples 1–4, inclusive.

Composition of matter, Example 8

Amides derived from diglycerylamine, and preferably, obtained by the action of glycidol on the amide, are substituted for the corresponding monoethanolamine amides in Composition of matter, Examples 1–4, inclusive.

Composition of matter, Example 9

In Composition of matter, Examples 1–8, preceding, any residual acidity present is removed by cautiously adding a dilute solution of ammonium hydroxide until the resultant product gives a clear, limpid solution in water, particularly in dilute form.

Composition of matter, Example 10

In Composition of matter, Examples 1–8, preceding, any residual acidity present is removed by cautiously adding a dilute solution of triethanolamine until the resultant product gives a clear, limpid solution in water, particularly in dilute form.

Composition of matter, Example 11

In Composition of matter, Examples 1–8, preceding, any residual acidity present is removed by cautiously adding a dilute solution of tris(hydroxymethyl)aminomethane until the resultant product gives a clear, limpid solution in water, particularly in dilute form.

Composition of matter, Example 12

The same procedure is followed as in Composition of matter, Examples 1–11, inclusive, except that an intermediate product of the kind exemplified by Intermediate product Example 4, is substituted for that in Intermediate product, Examples 1, 2 and 3.

Composition of matter, Example 13

The same procedure is followed as in Composition of matter, Examples 1–11, inclusive, except that an intermediate product of the kind exemplified by Intermediate product, Example 5, is substituted for that in Intermediate product, Examples 1, 2 and 3.

Composition of matter, Example 14

The same procedure is followed as in Composition of matter, Examples 1–11, inclusive, except that an intermediate product of the kind exemplified by Intermediate product, Example 6, is substituted for that in Intermediate product, Examples 1, 2 and 3.

Composition of matter, Example 15

The same procedure is followed as in Composition of matter, Examples 1–11, inclusive, except that an intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form or at least to the form in which the bifunctional alcohol, i. e., a glycol, and the polyfunctional acid, usually a bifunctional compound, react to give a chain type compound in which the adjacent acid and glycol nucleus occur as a structural unit. For instance, in the monomeric form this may be indicated in the following manner:

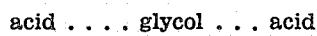

acid . . . . glycol . . . acid

If, however, one prepared an intermediate product employing the ratio of three moles of maleic anhydride and two moles of nonaethylene glycol, the tendency would be to produce a product which might be indicated in the following manner:

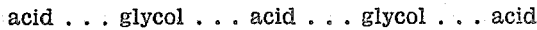

acid . . . glycol . . . acid . . . glycol . . . acid

Similarly, three moles of the glycol and four moles of the acid would give a combination which may be indicated thus:

acid . . glycol . . acid . . glycol . .
acid . . glycol . . acid

Another way of stating the matter is that the composition may be indicated in the following manner:

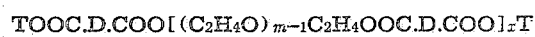

$$TOOC.D.COO[(C_2H_4O)_{m-1}C_2H_4OOC.D.COO]_xT$$

in which the characters have their previous significance and $x$ is a relatively small whole number less than 10, and probably less than 5; and in the monomeric form $x$, of course, is 1. The limitations on the size of $x$ are probably influenced largely by the fact that reaction leading to further growth is dependent upon random contact. Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid, instead of adipic acid;

(d) By using an alcoholic material of lower molecular weight, for instance, a substituted ricinoleoamide, instead of the substituted amide of a wax acid of higher molecular acid.

In any event, it is to be noted that the compounds of the type herein contemplated are limited to the water-soluble type, i. e., those which are self-emulsifying in water or produce a sol or a molecular solution.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken so that neutralization takes place without saponification or decomposition of the ester. In some cases there is no objection to the presence of the acidic group. Instead, if a tribasic acid be employed in such a manner as to leave one free carboxyl group, then it is usually desirable to neutralize such group by means of a suitable basic matrial.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

Having thus described our invention, what we claim as new and desire to secure by Letters Patent is:

1. A process for breaking water-in-oil emulsions, characterized by subjecting the emulsion to the action of a demulsifier comprising a water-soluble esterification product derived by reaction between one mole of a polybasic compound and two moles of a water-insoluble detergent-forming acid amide having an acyl radical containing more than 8 and not more than 32 carbon atoms and having a substituted amide radical in which at least one alcholiform hydroxy hydrocarbon radical is a substituent for an amino hydrogen atom; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol.

2. A process for breaking water-in-oil emulsions, characterized by subjecting the emulsion to the action of a demulsifier comprising a neutral water-soluble esterification product derived by reaction between one mole of a polybasic compound and two moles of a water-insoluble detergent-forming acid amide having an acyl radical containing more than 8 and not more than 32 carbon atoms and having a substituted amide radical in which at least one alchloriform hydroxy hydrocarbon radical is a substituent for an amino hydrogen atom; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol.

3. A process for breaking water-in-oil emulsions, characterized by subjecting the emulsion to the action of a demulsifier comprising a neutral water-soluble esterification product derived by reaction between one mole of a dibasic compound and two moles of a water-insoluble detergent-forming acid amide having an acyl radical containing more than 8 and not more than 32 carbon atoms and having a substituted amide radical in which at least one alcoholiform hydroxy hydrocarbon radical is a substituent for an amino hydrogen atom; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol.

4. A process for breaking water-in-oil emulsions, characterized by subjecting the emulsion to the action of a demulsifier comprising a neutral water-soluble esterification product derived by reaction between one mole of a dibasic compound and two moles of a water-insoluble detergent-forming acid amide having an acyl radical containing more than 8 and not more than 32 carbon atoms and having a substituted amide radical in which at least one alcoholiform hydroxy hydrocarbon radical is a substituent for an amino hydrogen atom; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the polybasic acid for each mole of the glycol.

5. A process for breaking water-in-oil emulsions, characterized by subjecting the emulsion to the action of a demulsifier comprising a neutral water-soluble esterification product derived by reaction between one mole of a dibasic compound and two moles of a water-insoluble detergent-forming fatty acid amide in which the acyl radical contains 18 carbon atoms and the substituted amide radical contains at least one alcoholiform hydroxy hydrocarbon radical; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol.

6. A process for breaking water-in-oil emulsions, characterized by subjecting the emulsion to the action of a demulsifier comprising a neutral water-soluble compound of the following formula type:

TOOC.D.COO[C₂H₄O)$_m$C₂H₄OOC.O.COO]$_x$T

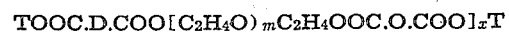

in which T is a radical derived by dehydroxylation of a water-insoluble fatty acid amide having an acyl radical containing more than 8 and not over 32 carbon atoms, and a substituted amide radical containing at least one alcoholiform hydroxy hydrocarbon radical; OOC.D.COO is the acid radical derived from a dibasic acid by removal of the acidic hydrogen atoms; said acid radical having not over 6 carbon atoms; m represents a numeral varying from 7 to 12; x is a small whole number less than 10.

7. A process for breaking water-in-oil emulsions, characterized by subjecting the emulsion to the action of a demulsifier comprising a neutral water-soluble compound of the following formula type:

TOOC.D.COO(C₂H₄O)$_m$C₂H₄OOC.D.COO.T

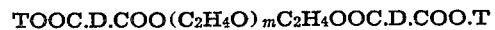

in which T is a radical derived by dehydroxylation of a water-insoluble fatty acid amide having an acyl radical containing more than 8 and not over 32 carbon atoms, and a substituted amide radical containing at least one alcoholiform hydroxy hydrocarbon radical; OOC.D.COO is the acid radical derived from a dibasic acid by removal of the acidic hydrogen atoms; said acid radical having not over 6 carbon atoms; and m represents a numeral varying from 7 to 12.

8. A process for breaking water-in-oil emulsions, characterized by subjecting the emulsion to the action of a demulsifier comprising a neutral water-soluble compound of the following formula type:

TOOC.D.COO(C₂H₄O)$_m$C₂H₄OOC.D.COO.T

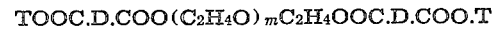

in which T is a radical derived by dehydroxylation of a water-insoluble fatty acid amide having an acyl radical containing more than 8 and not over 32 carbon atoms, and a substituted amide radical containing at least one alcoholiform hydroxy hydrocarbon radical; OOC.D.COO is the acid radical derived from maleic acid by removal of the acidic hydrogen atoms; and m represents a numeral varying from 7 to 12.

9. A process for breaking water-in-oil emulsions, characterized by subjecting the emulsion to the action of a demulsifier comprising a neutral water-soluble compound of the following formula type:

TOOC.D.COO(C₂H₄O)$_m$C₂H₄OOC.D.COO T

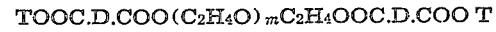

in which T is a radical derived by dehydroxylation of a water-insoluble fatty acid amide having an acyl radical containing more than 8 and not over 32 carbon atoms, and a substituted amide radical containing at least one alcoholiform hydroxy hydrocarbon radical; OOC.D.COO is the acid radical derived from succinic acid by removal of the acidic hydrogen atoms; and m represents a numeral varying from 7 to 12.

10. A process for breaking water-in-oil emulsions, characterized by subjecting the emulsion to the action of a demulsifier comprising a neutral water-soluble compound of the following formula type:

TOOC.D.COO(C₂H₄O)$_m$C₂H₄OOC.D.COO.T

in which T is a radical derived by dehydroxylaof a water-insoluble fatty acid amide having an acyl radical containing more than 8 and not over 32 carbon atoms, and a substituted amide radical containing at least one alcoholiform hydroxy hydrocarbon radical; OOC.D.COO is the acid radical derived from adipic acid by removal of the acidic hydrogen atoms; and m represents a numeral varying from 7 to 12.

MELVIN DE GROOTE.
BERNHARD KEISER.

CERTIFICATE OF CORRECTION.

Patent No. 2,296,600. September 22, 1942.

MELVIN DE GROOTE, ET AL.

It is hereby certified that error appears in the printed specification of the above numbered patent requiring correction as follows: Page 1, first column, line 7, after the word "comprise" insert --fine--; second column, line 20, in the formula, for "$C_2H_2$." read --$C_2H_4$.--; page 3, first column, line 3, for "V" read --X--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.